United States Patent [19]

Lohr

[11] Patent Number: 5,040,814
[45] Date of Patent: Aug. 20, 1991

[54] ROAD TRANSPORT UNIT WITH DEMOUNTABLE BODY

[75] Inventor: Robert Lohr, Hangenbieten, France

[73] Assignee: Lohr Industries, S.A., Hangenbieten, France

[21] Appl. No.: 379,029

[22] Filed: Jul. 12, 1989

[30] Foreign Application Priority Data

Jul. 13, 1988 [FR] France .................. 88 09713

[51] Int. Cl.⁵ .................................. B62D 63/00
[52] U.S. Cl. .......................... 280/401; 280/438.1; 280/441; 296/35.3; 410/4
[58] Field of Search ........ 280/401, 438.1, 441, 280/475, 402, 441.1, DIG. 14; 410/3, 4, 6, 26, 29.1; 414/498; 296/181, 182, 183, 353

[56] References Cited

U.S. PATENT DOCUMENTS

| | | | |
|---|---|---|---|
| 1,970,967 | 8/1934 | Maust | 280/401 |
| 2,233,697 | 3/1941 | Freitag | 280/401 |
| 2,841,094 | 7/1958 | Schumacher | 296/181 |
| 3,532,236 | 1/1969 | Hostetler | 414/498 |
| 3,706,464 | 12/1972 | Burrows et al. | 280/401 |
| 3,751,060 | 8/1973 | Holmberg et al. | 280/402 |
| 4,429,892 | 2/1984 | Frampton | 280/438.1 |
| 4,623,197 | 11/1987 | Stluka | 296/182 |
| 4,738,575 | 4/1988 | Blodgett et al. | 296/181 |
| 4,773,336 | 9/1988 | Orb | 280/441.1 |
| 4,784,545 | 11/1988 | Lawrence | 410/26 |
| 4,817,537 | 4/1989 | Cripe et al. | 296/182 |
| 4,856,804 | 8/1989 | Nash | 280/441 |

FOREIGN PATENT DOCUMENTS

| | | | |
|---|---|---|---|
| 0196924 | 10/1986 | European Pat. Off. | 410/29.1 |
| 2129745 | 5/1984 | United Kingdom | 296/181 |

*Primary Examiner*—Charles A. Marmor
*Assistant Examiner*—Anne Marie Boehler
*Attorney, Agent, or Firm*—Schwartz & Weinrieb

[57] ABSTRACT

Demountable road transport unit characterized in that it consists of a motor vehicle (8) equipped with a coupling (5) and a demountable body (9), the coupling on the motor vehicle, situated towards the front, and the body comprising on the one hand, in front, a supporting and locking link and also two supports for the body in the demounted position and on the other, at the rear, immobilizing and centering device (30) and also at least one rear support and, towards the bottom, a towing hook support integrated into the body.

16 Claims, 19 Drawing Sheets

ROAD TRANSPORT UNIT WITH DEMOUNTABLE BODY

FIELD OF THE INVENTION

The present invention relates to a road transport unit which is intended, in conjunction with a motor vehicle, to form an articulated road transport assembly with a demountable body.

BACKGROUND OF THE INVENTION

Articulated road transport units are known which consist of a tractor vehicle and a semi-trailer. At the level of its rear axle, the tractor vehicle is equipped with a means of coupling it to the semi-trailer. This coupling means is commonly known as an axle tree bolster or fifth wheel.

These tractors have one important and specific feature, by virtue of their particular technical nature and the method of coupling to the semi-trailer. This specific feature condemns them to being coupled solely to semi-trailers to the exclusion of any other type of trailer.

Road transport units are also known which consist of a carrier vehicle which is attached to a trailer. The carrier vehicle has at the rear of its chassis a coupling means known commonly as a towing hook. In this case, the vehicle, carrier and tractor, is a chassis-cab assembly fitted with a body supported by the chassis with which the towing hook is rigid.

Although the range of use of a utility vehicle is already quite vast, the imperatives of profitability of a fleet of utility vehicles require operators to strive for an even greater versatility of use.

Thus, operators want to be able also to use the above-mentioned specific tractors for other particular applications of transport, for example for the transporting of motor vehicles.

With this spirit of profitability in mind and in order to reduce the period of non-availability corresponding to conversion and the fitting of equipment in the workshops run by people who prepare vehicles for specific uses, bodies are known which are removable in the same way as specialised removable structures which are intended to be mounted on bare chassis.

A typical example in the field of vehicle transporters is the removable carrier structure described in the patent filed in ITALY in the name of Messrs. ROLFO under number 53902B/82.

Upon analysis, this prior invention only relates to a simple structure intended to be conventionally connected to a carrier chassis or other chassis, like an immobilised cargo, that is to say like a container fixed by four detachable links to the chassis of the carrier vehicle.

This carrier structure consists essentially of a removable frame intended to be fitted and locked to a simple chassis without giving rise to any functional technical alteration to the carrier vehicle. By way of other technical elements, it comprises only those needed to support the cargo and leaves the towing hook rigid with the chassis so that the carrier vehicle retains its functional individuality. For reasons of ease of manufacture and speed of intervention in the case of a bodywork transplant, the carrier vehicle is not converted.

Due to the weight of this body, the operation of substituting this structure on a given chassis requires the use of external handling means which are not available everywhere, not even on unloading areas.

Therefore, this type of carrier structure comprises no mechanical coupling element other than those which are intended to fix it to the chassis. In particular, it comprises no support for the towing hook which, if it exists, remains rigid with the longitudinal members of the chassis.

OBJECTION OF THE INVENTION

It is precisely an object of the present invention to permit of better exploitation of a tractor motor vehicle of the semi-trailer type by increasing its technical potential for coupling, receiving and fixing on its chassis a carrier structure and consequently its possibilities of commercial use.

SUMMARY OF THE INVENTION

For this purpose, the invention relates to a road transport unit which can be divided into a tractor vehicle and a carrier body, characterised in that it is composed of a tractor vehicle equipped with a longitudinal locking means and a demountable body, the chassis of the tractor vehicle being arranged for displacement of its coupling means forwards and the body comprising, in the front, a supporting and locking link as well as two support means and, at the rear, immobilising and centring means together with at least one rear support means when the body is demounted and, towards the bottom, a towing hook support integrated into the demountable body.

Apart from the adaptation to the imperatives of profitability of operation satisfied by rapid removal, the characteristic features of the invention allow it to enjoy the following multiple advantages:

easy and instant detachment and rapid conversion to a tractor of a semi-trailer and vice versa, this adaptation being just as rapid so that the unit can become a carrier-tractor in an articulated road transport unit;

advantages linked with the self-supporting nature of the demountable body which forms an integral part of the unit;

loading and unloading operations can be carried out without the tractor vehicle present;

removal and fitment by one single unskilled person, for example the driver and without any exterior means;

simplicity and low cost of preparing the chassis and immobilising of the motor vehicle in the workshop which belongs to the company preparing the vehicle;

integral interchangeable nature: the same body can be mounted on any carrier vehicles which are so prepared;

possibility of organising circuits in transport relays.

Another advantage lies in the fact that by virtue of the particular form of the rear chassis of the demountable body, it is possible to bring the towing hook close to the rear axle in order to reduce the torque induced by the ratio of the cargo on the trailer through the towing hook.

BRIEF DESCRIPTION OF THE DRAWINGS

The present invention will be clearly understood from the ensuing description which is given by way of non-limitative example, within the framework of an application to a vehicle transporter unit, and in respect of an embodiment referred to in the accompanying drawings, in which.

Figure 21:
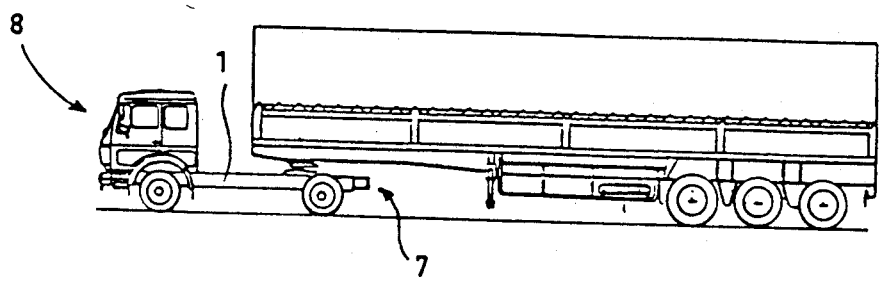
FIGS. 21 to 26 are profile views of a unit employing a road transport rig according to the invention, in the following configurations.
Figure 22:
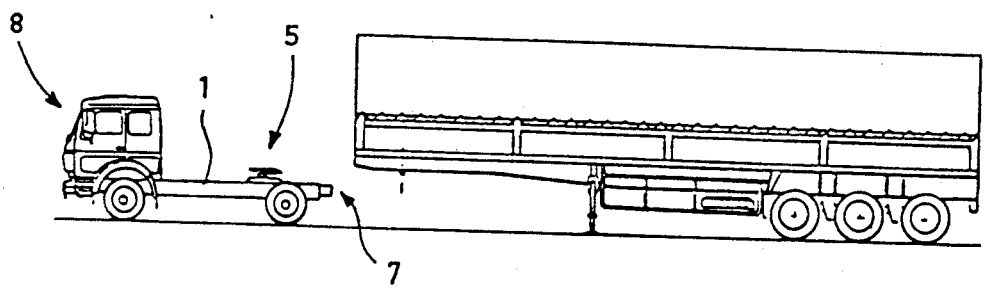
Figure 23:
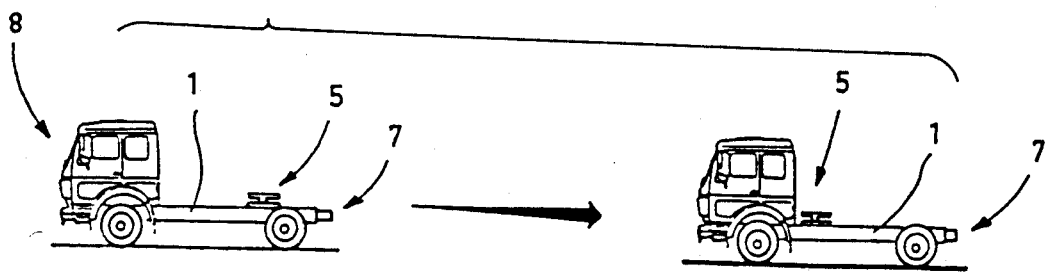
Figure 24:
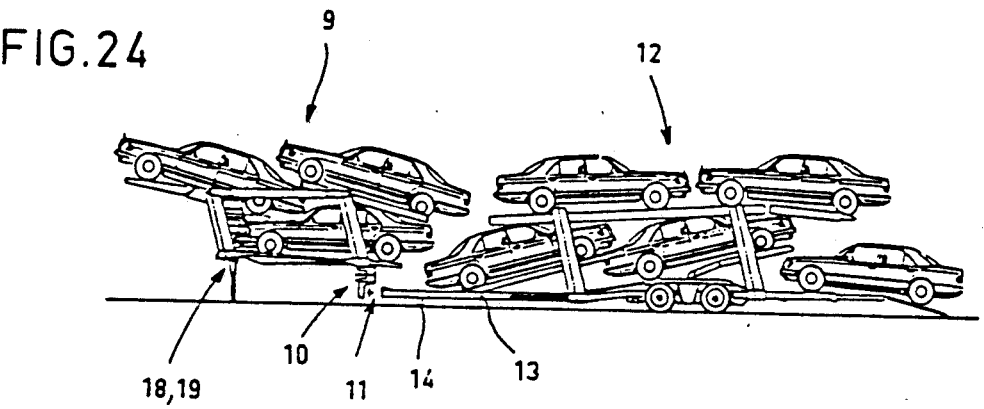
Figure 25:
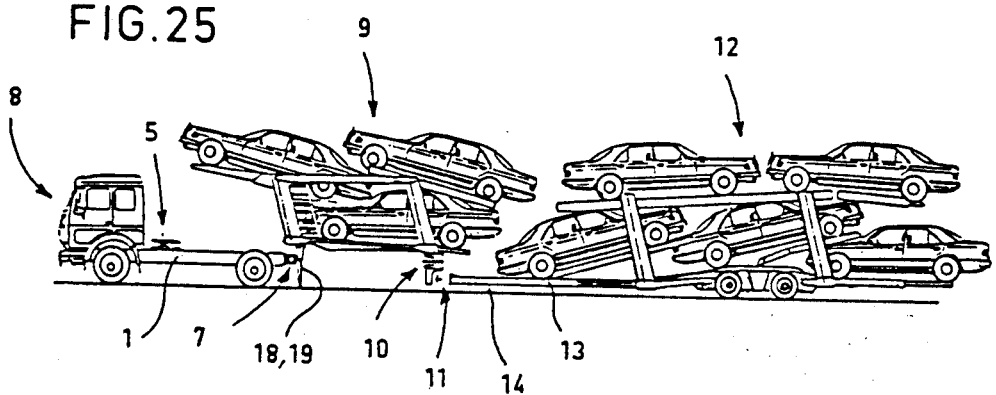
Figure 26:
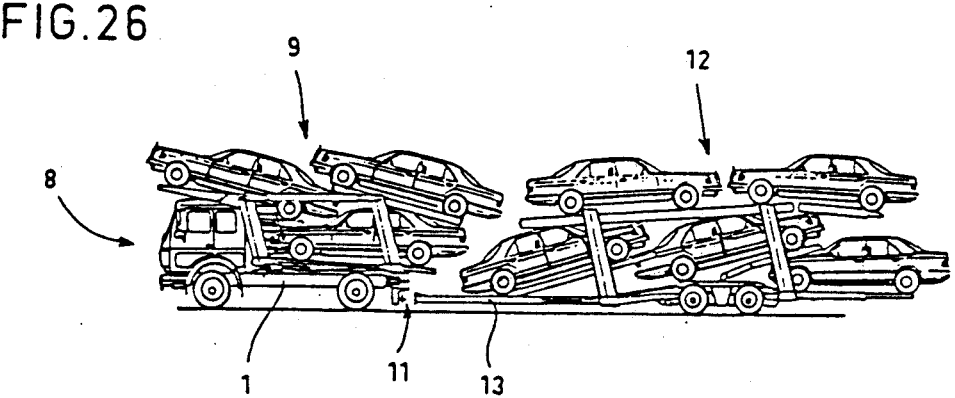

articulated rig consisting of a semi-trailer and a tractor vehicle (FIG. 21)

articulated rig separated and showing the tractor vehicle on the one hand and the self-supporting semi-trailer on the other (FIG. 22)

tractor vehicle prior to being adapted to become a carrier vehicle and after its adaptation (FIG. 23)

articulated rig loaded with vehicles, consisting of the demountable body and its tractor, waiting on a storage area (FIG. 24)

presentation of the carrier vehicle-tractor under the demountable body in the self-supporting position, attached to its tractor (FIG. 25)

body mounted on the carrier vehicle-tractor and coupled thereto, constituting a complete road transport unit ready for departure (FIG. 26).

Figure 27:
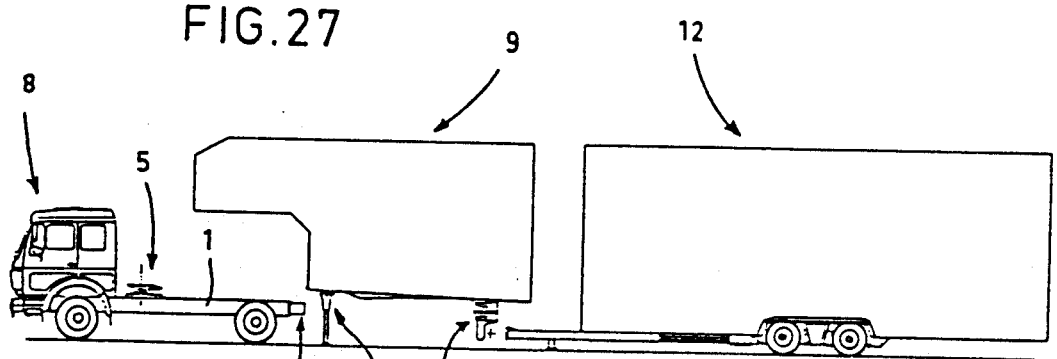
Figure 28:
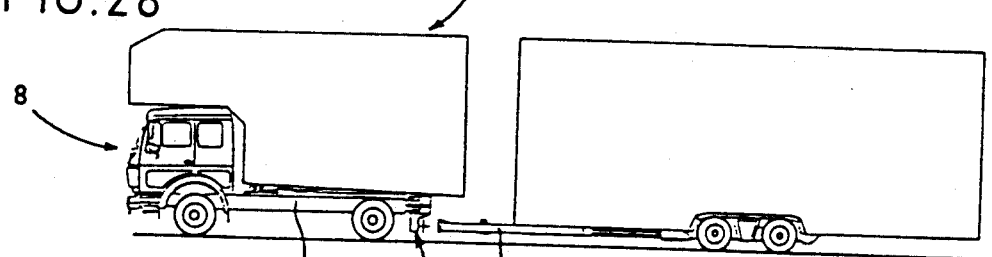
Figure 29:
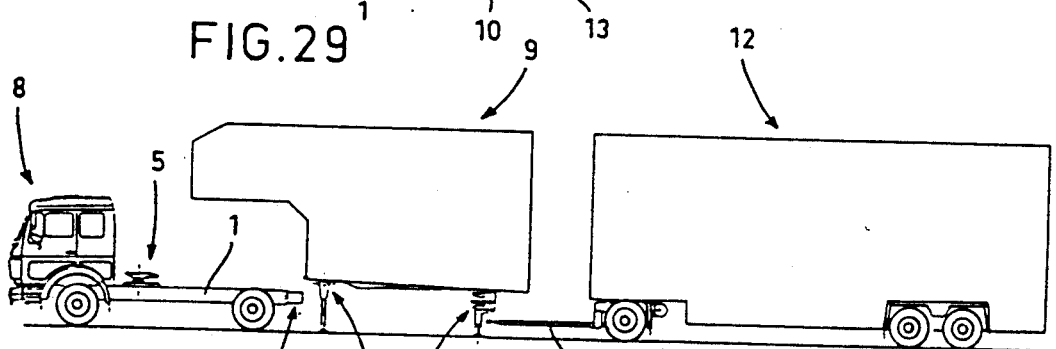
Figure 30:
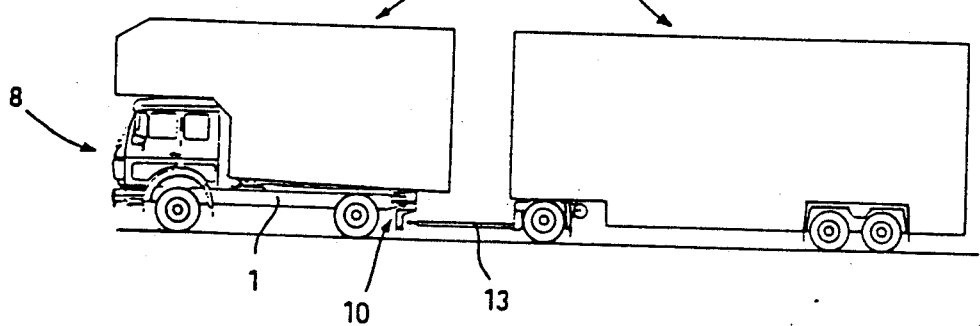

FIGS. 27 to 30 are profile views of a unit comprising respectively demounted body which is then, within the framework of applications, carried to other types of carrier bodies:

FIGS. 27 and 28, example of a rig comprising a semi-supported tractor;

FIGS. 29 and 30 are an example of a rig of the type with a tractor with a front-axle.

Figure 31:
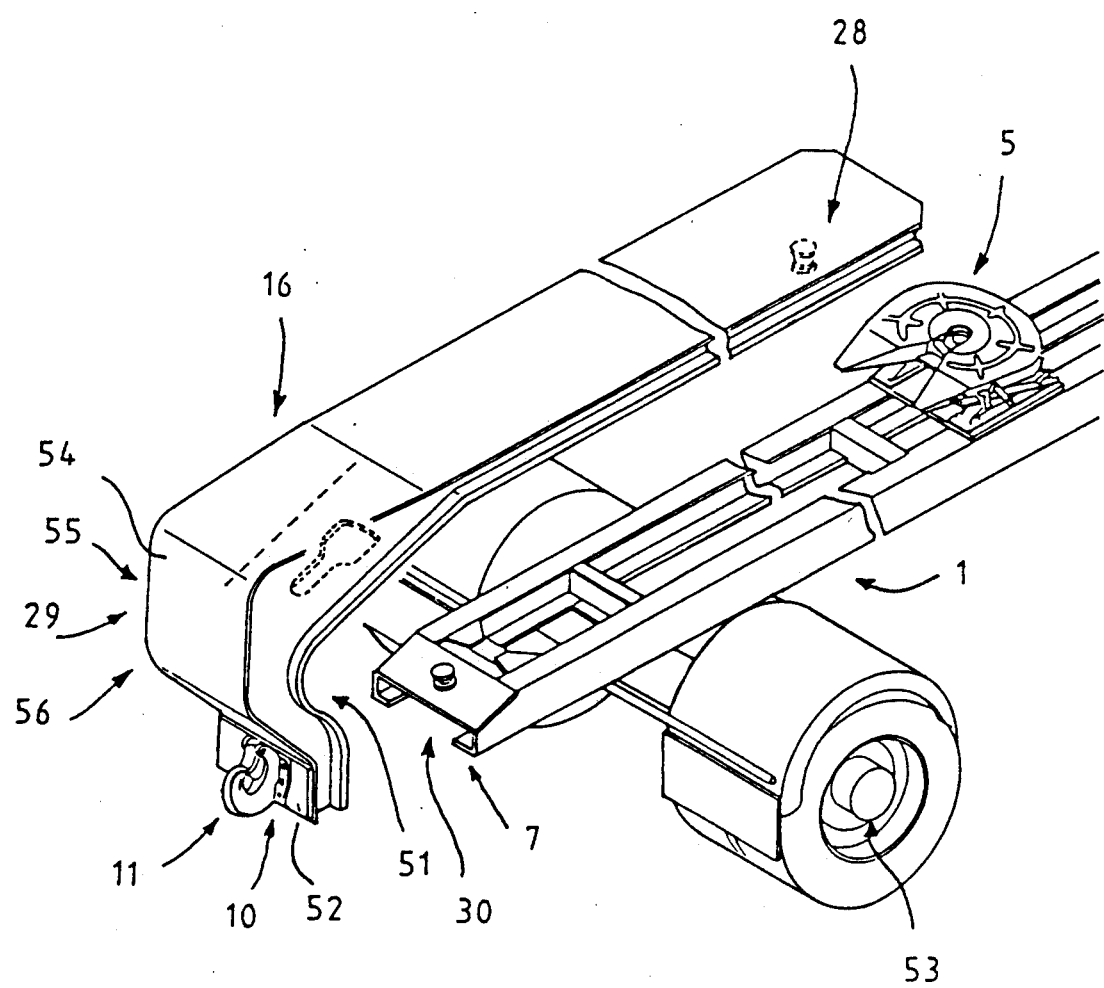
Figure 32:
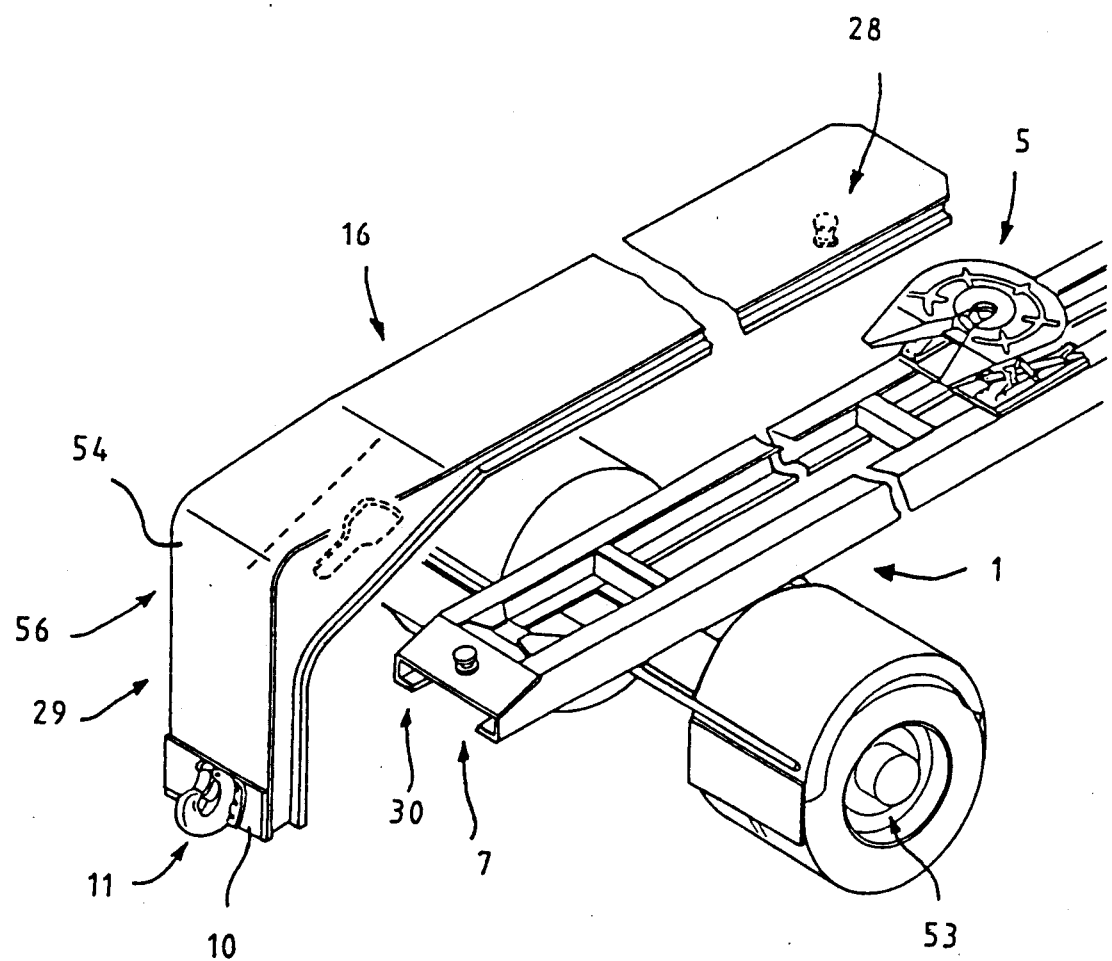
Figure 33:
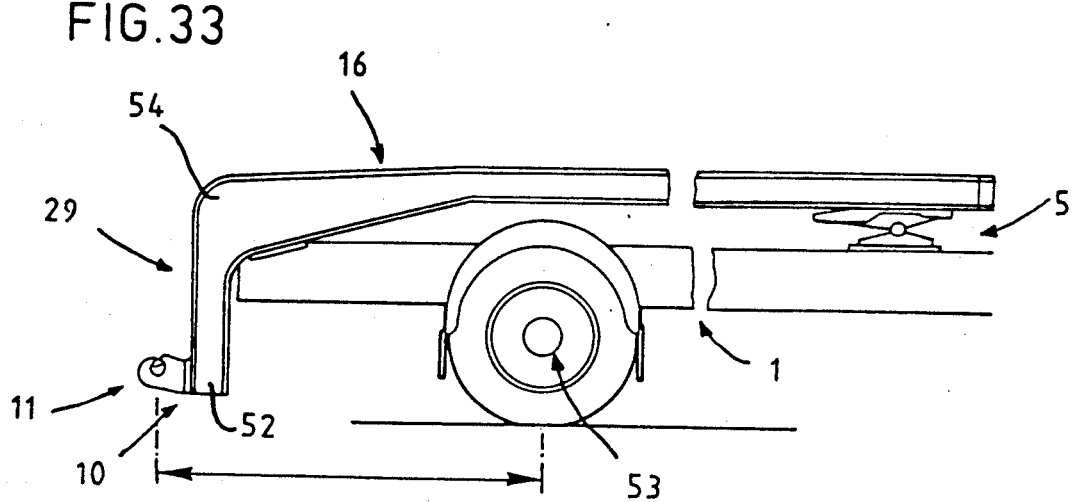
Figure 34:
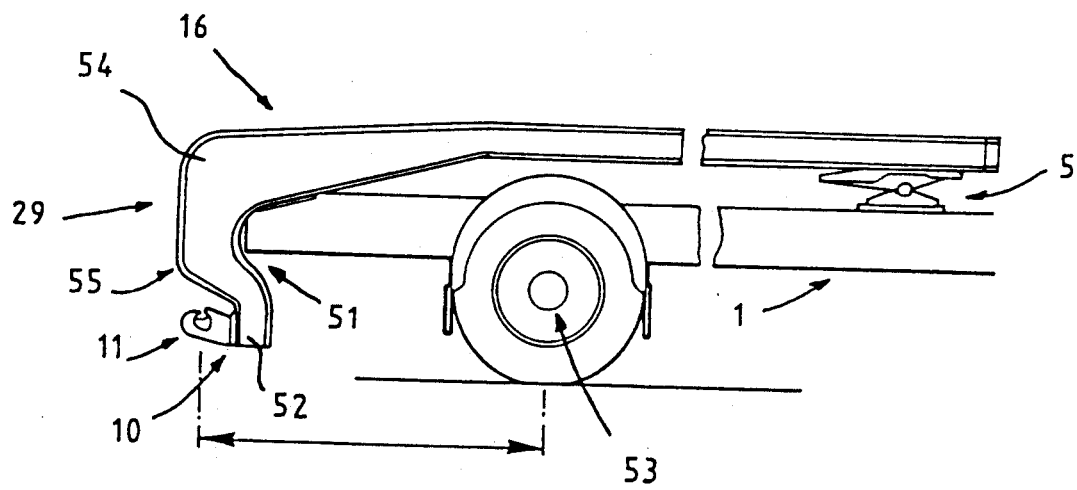
Figure 35:
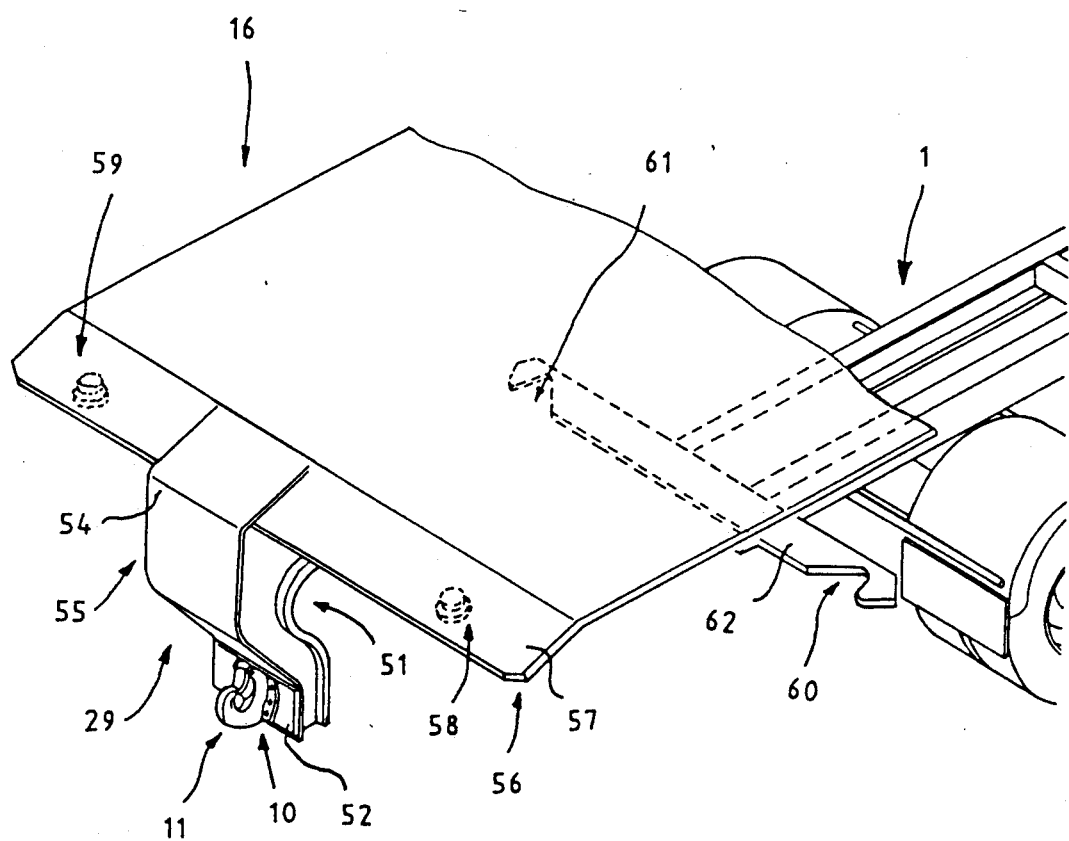
Figure 36:
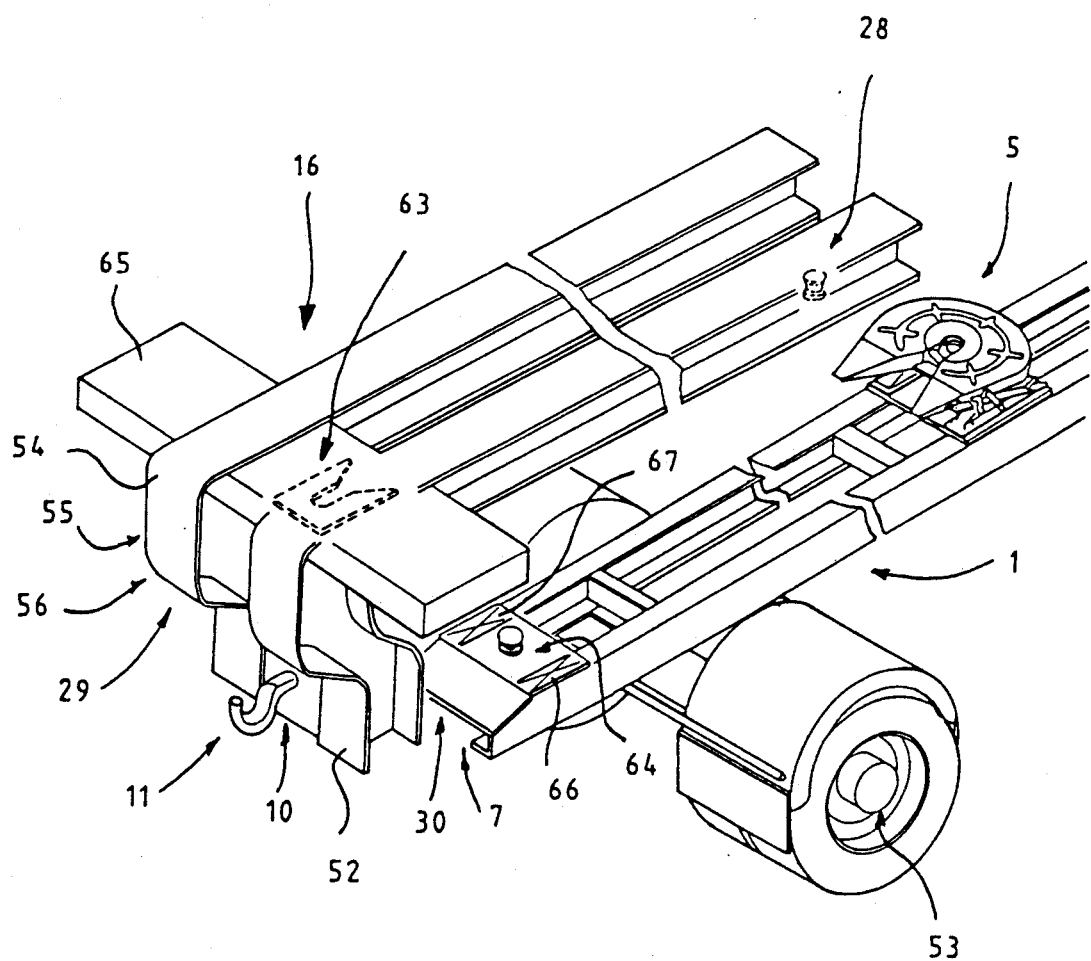

FIG. 31 is a diagrammatic perspective view of the general technical form of the chassis of the demountable body and of the means of locking and centring it on the chassis, in a first embodiment;

FIG. 32 is a diagrammatic perspective view identical to that in FIG. 31 and concerning a second embodiment;

FIGS. 33 and 34 are profile views showing the particular form of rear chassis of the demountable body showing the two above versions and the respective positions of the towing hook in relation to the rear axle;

FIGS. 35 and 36 are diagrammatic perspective views of two derived technical forms which are equivalent to the chassis of the body and the lorry chassis, in two equivalent alternative embodiments.

DETAILED DESCRIPTION OF THE ILLUSTRATED EMBODIMENT

The general idea underlying the invention resides on the one hand in adapting or in updating a tractor vehicle of the semi-trailer type with a view to its receiving a carrier structure, the said tractor vehicle becoming a carrier-tractor but retaining an aptitude for rapid conversion to a tractor vehicle.

Furthermore and more generally speaking, the general inventive idea resides in providing a chassis for a demountable body intended to be mounted on a lorry chassis which has at the front supporting and locking means for locking the body to the chassis, the bodywork chassis comprising at the rear additional bearing zones, centring means and a means of returning downwardly carrying at its bottom end the towing hook, as FIGS. 31 to 34 show.

The rear part of the chassis of this demountable body has the general shape of a butt, for instance a pistol butt.

The downwards return may, at the start, have an incurvate form constituting a set back part intended to engage around the rear of the chassis. This set back portion is compensated by a forwards curve which ends perpendicularly downwardly.

The towing hook is thus much closer to the rear axle in order to reduce the reaction torque due to the load ratio originating from the tractor and transmitted through the towing hook.

On the other hand, the carrier body has a carried state in which it is rigid with the lorry chassis and a demounted state in which it is stable and immobile being supported at least at three points, being ready to be taken away by the carrier vehicle after a simple coupling operation.

The invention likewise relates to the demountable body which is in one body with its carrier.

Hereinafter, the terms motor vehicle, tractor vehicle and carrier vehicle-tractor will be used. These terms must be understood as having the following meanings:

motor vehicle: this is the general term which generally designates the assembly of particular vehicles referred to below;

tractor vehicle: this is a motor vehicle intended solely to pull a semi-trailer;

carrier vehicle: this is a motor vehicle carrying any load with or without the function of acting as a tractor.

On the other hand, it is clearly understood that the application to car transporter rigs must not in any way be regarded as restrictive.

The motor vehicle comprises a chassis 1 consisting of two longitudinal members 2 and 3 connected to each other at the end by a spacer and cross-member 4.

When it comes from the factory, the chassis has a coupling member, for example an axle tree bolster 5, at the level of its rear part. Thus it is equipped as a tractor with a view to towing for example a semi-trailer.

The tractor vehicle is prepared by moving the rear axle bolster 5 forwards by various means, for example by bringing together the auxiliary longitudinal members on which the body of the axle tree bolster 5 is removably mounted.

Then, the rear of the chassis is modified and adapted to a greater or lesser degree to retain a constant spacing "D" between the position of the rear axle bolster and the end of the chassis, whatever type and make of motor vehicle is involved, in order to ensure interchangeability.

Figure 1:
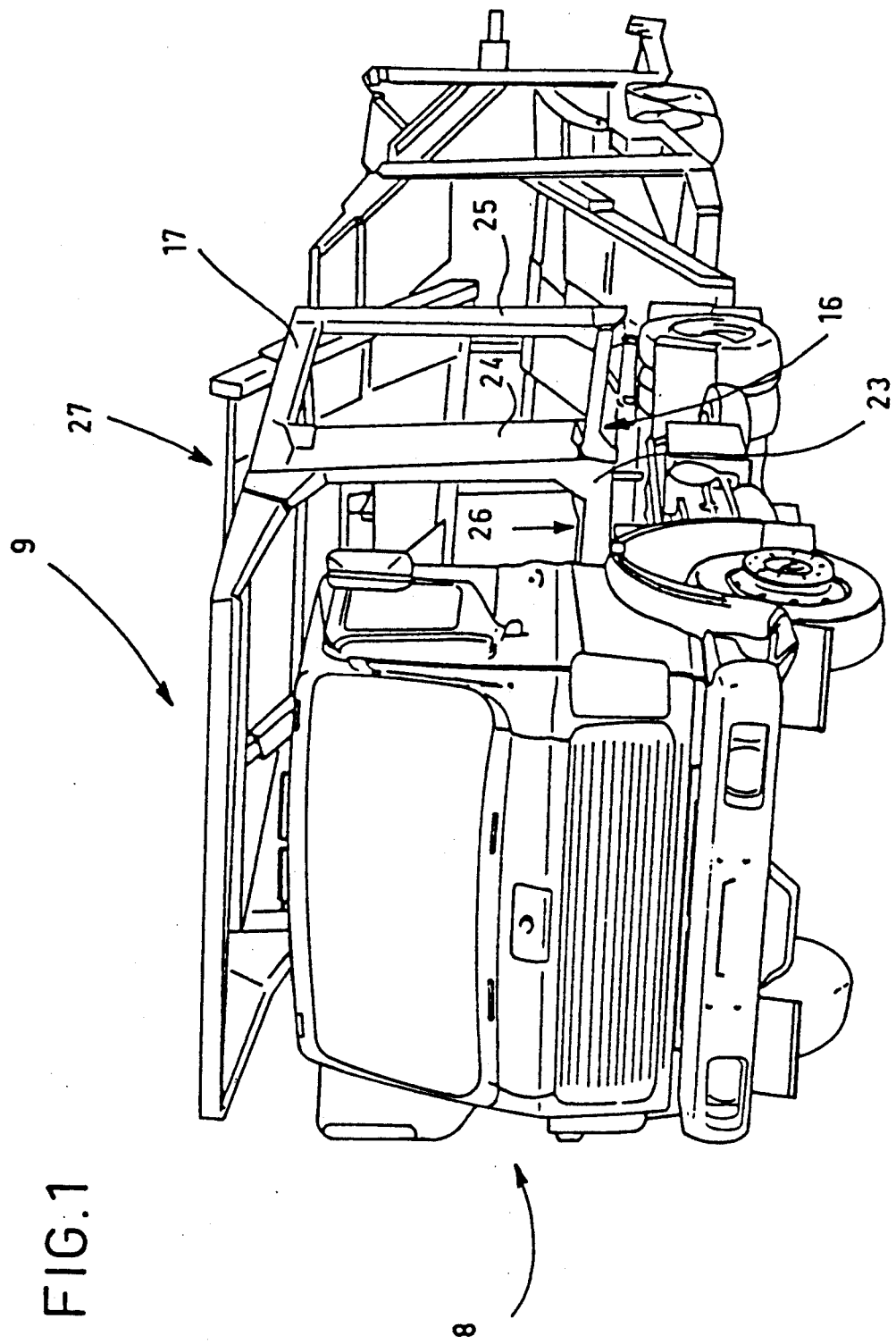
FIG. 1 is a general perspective of the road transport unit which consists of a supported body and a towed trailer.
Figure 2:
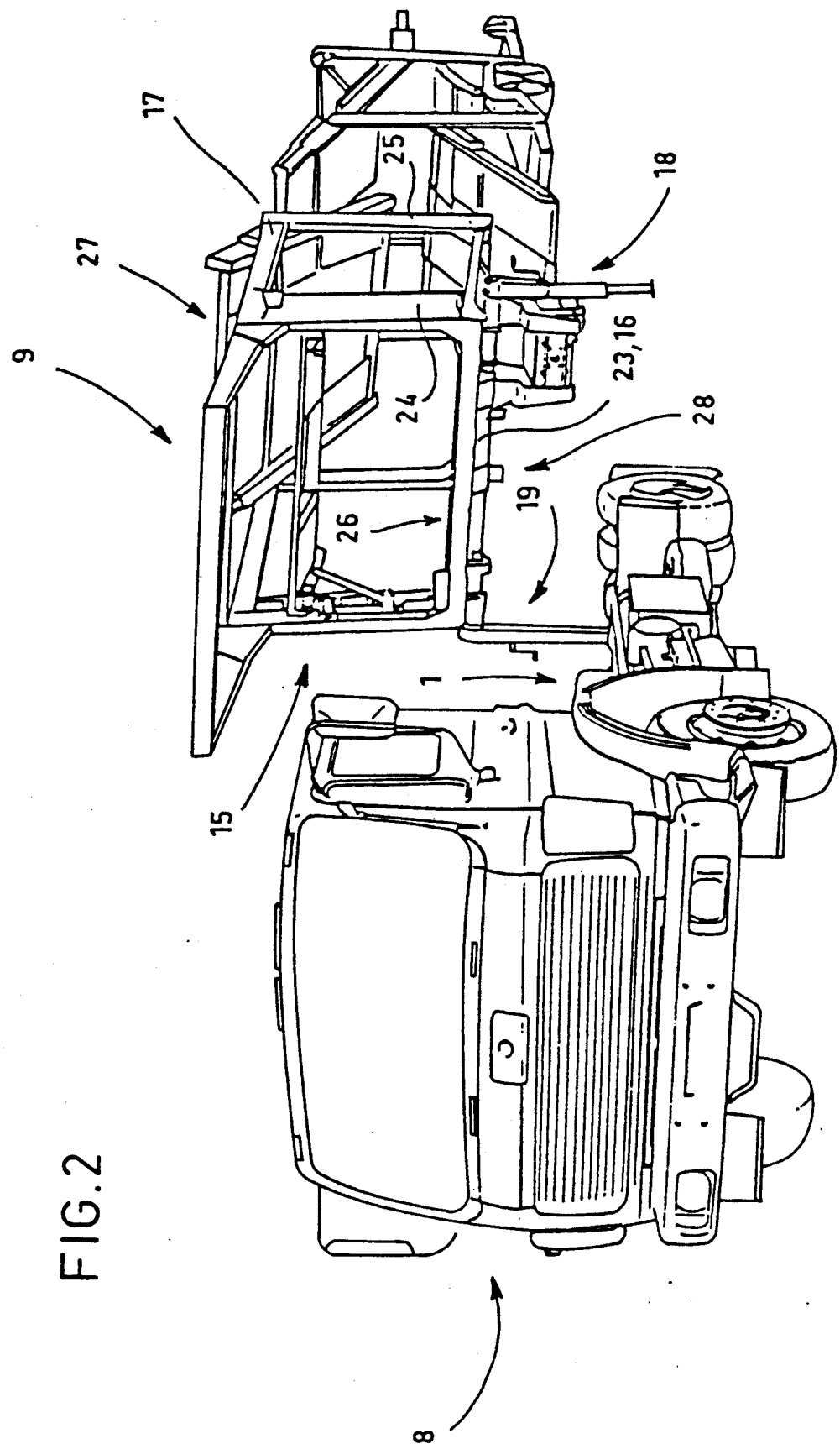
FIG. 2 is a general perspective view of the dissociated road transport unit, separated into the tractor vehicle on the one hand and the demounted body on the other, and with the waiting tractor attached.
Figure 3:
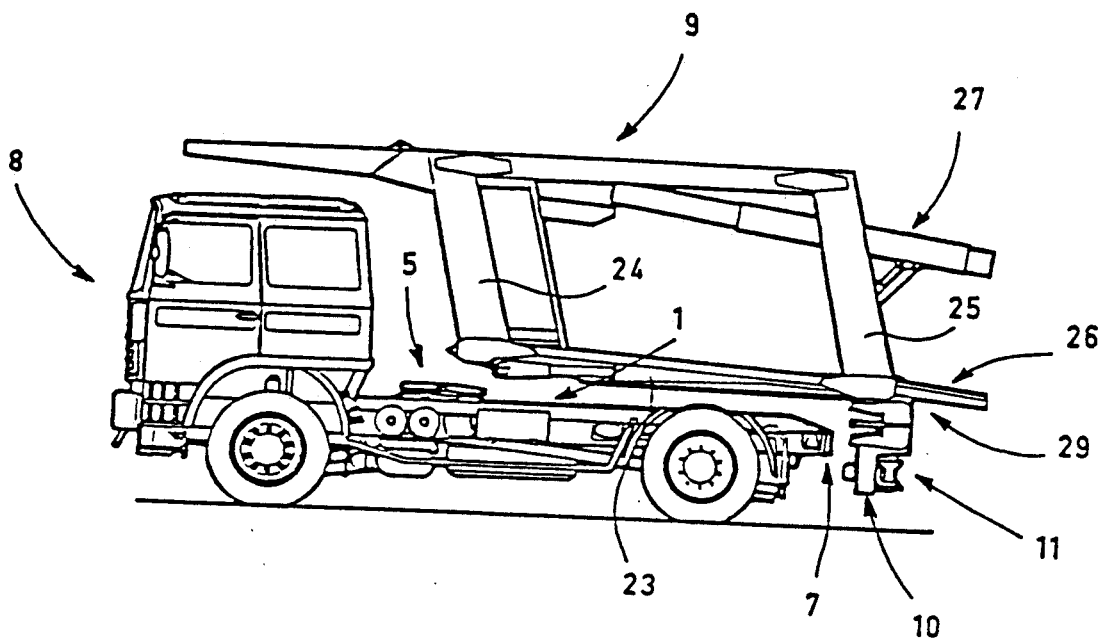
FIG. 3 is a profile view of the road transport unit according to the invention, the removable body offset above the carrier vehicle prior to positioning.
Figure 4:
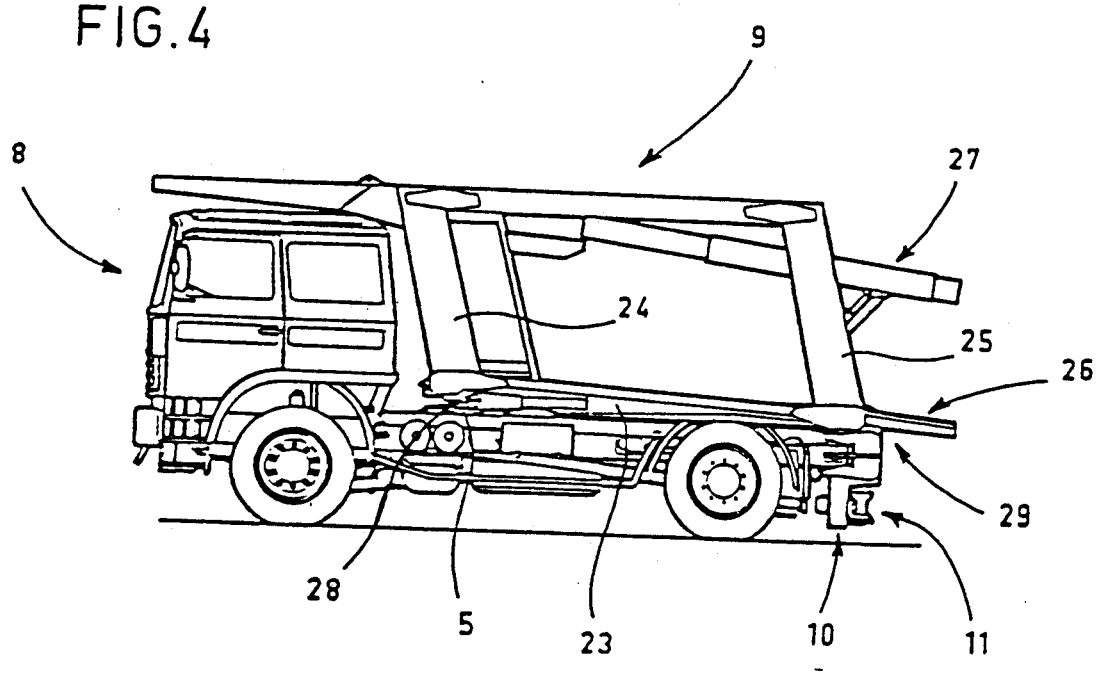
FIG. 4 is a profile view of the road transport unit according to the invention, the demountable body fixed to the carrier vehicle-tractor.
Figure 5:
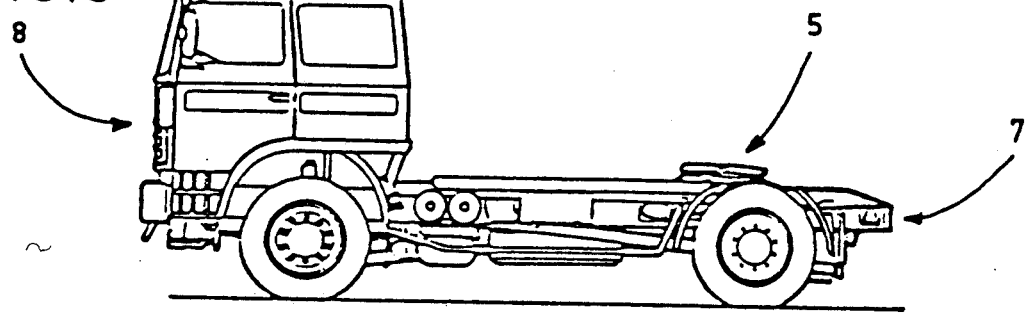
FIG. 5 is a profile view of a tractor in the original semi-trailer configuration, that is to say with the axle tree bolster towards the rear.
Figure 6:
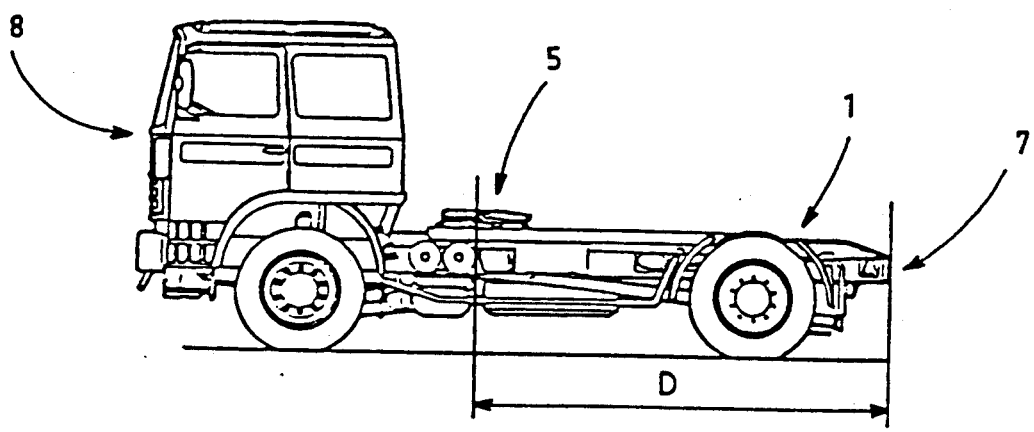
FIG. 6 is a profile view of the same tractor vehicle after it has been converted to receive the demountable body in order to become a carrier.
Figure 7:
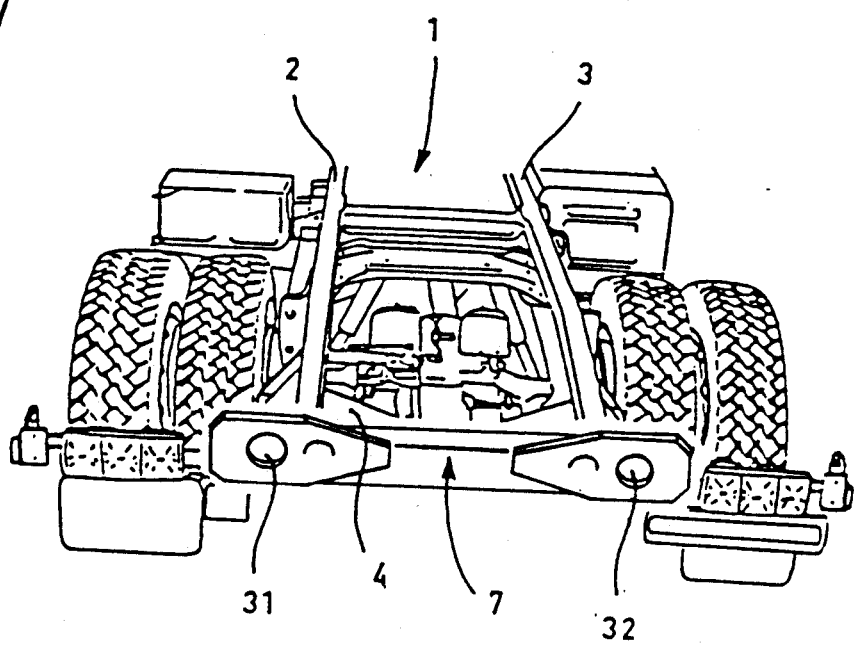
FIG. 7 is a simplified perspective view showing the end of the chassis provided with its centring cross-plate according to a first alternative embodiment.
Figure 8:
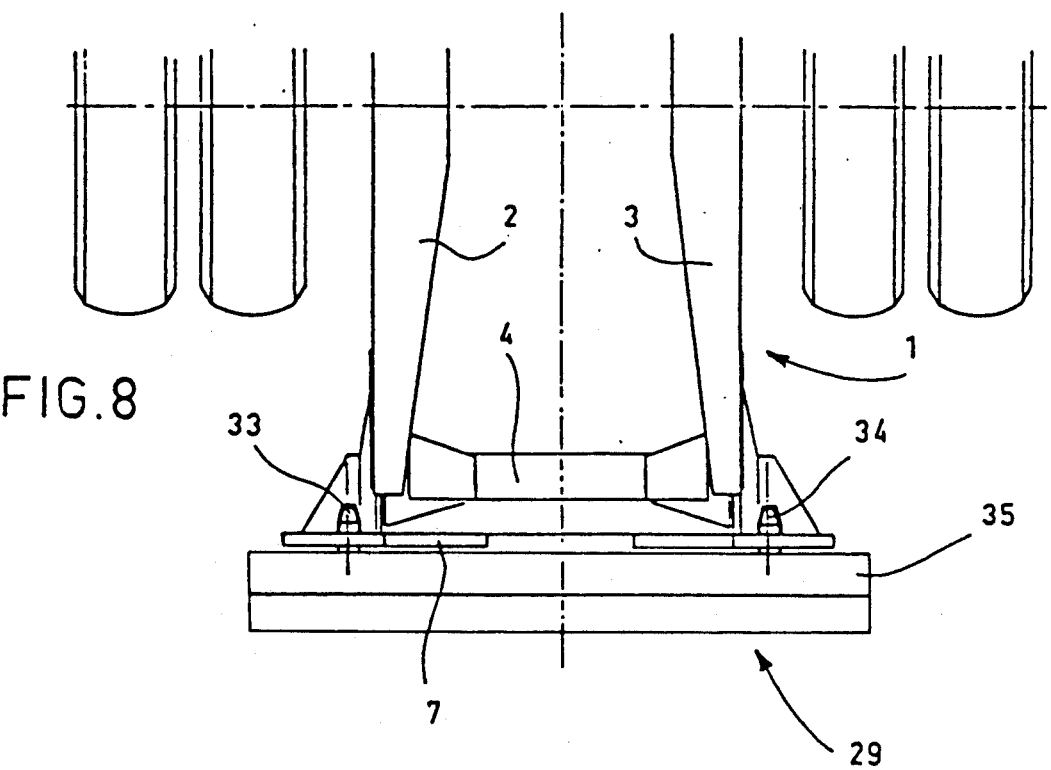
FIG. 8 is a plan view corresponding to FIG. 7 showing the coupled self-centring mechanism.
Figure 9:
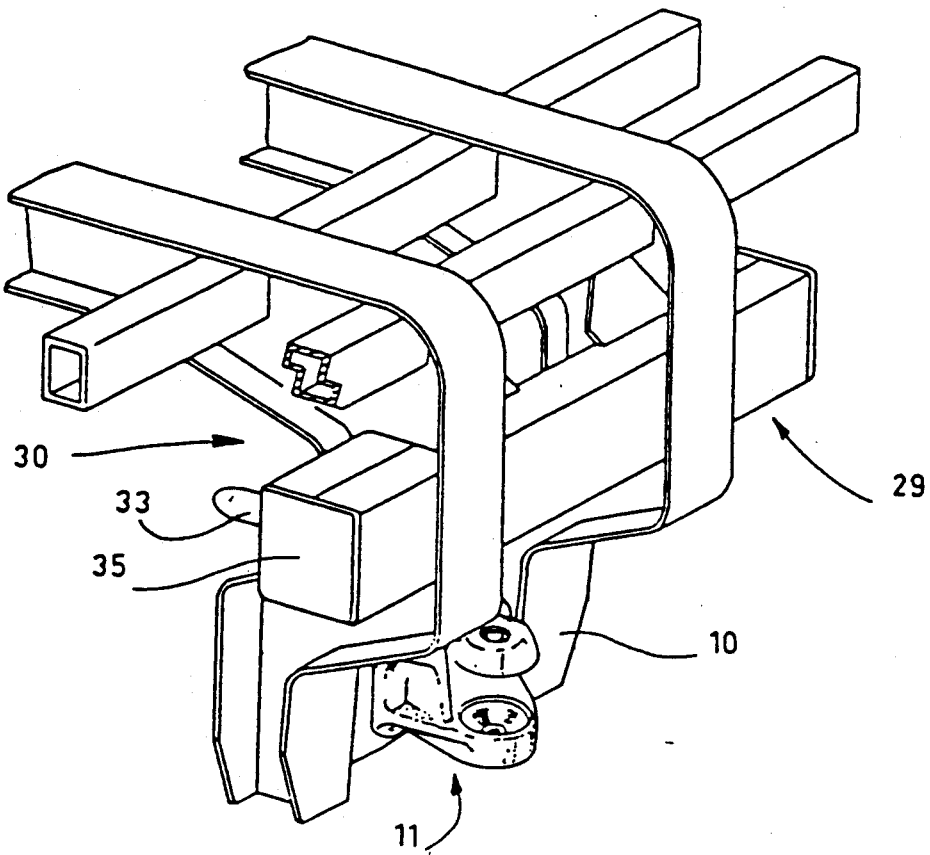
FIGS. 9 and 10 are perspective views which show the rear self-centring mechanism and the towing hook support viewed respectively from the rear, tractor side and from the front, carrier side, according to the first alternative embodiment.
Figure 10:
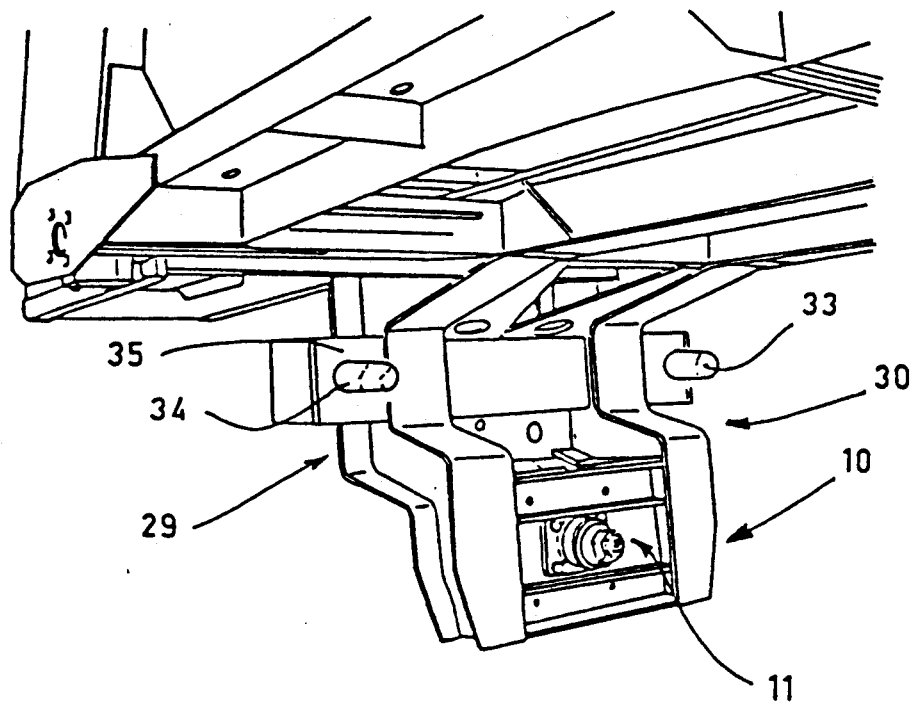
Figure 11:
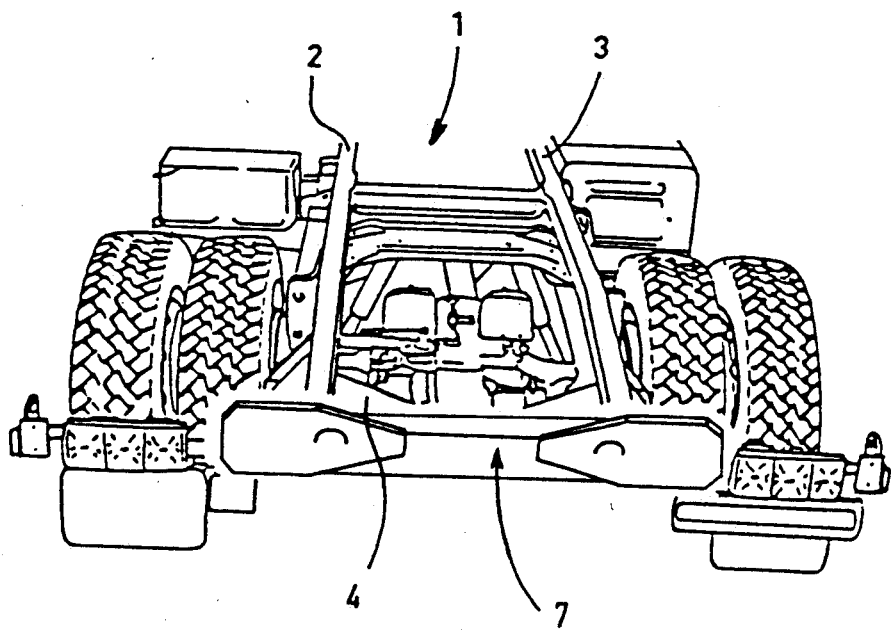
FIG. 11 is a simplified perspective view showing the end of the chassis provided with its centring transverse plate according to a second alternative embodiment.
Figure 12:
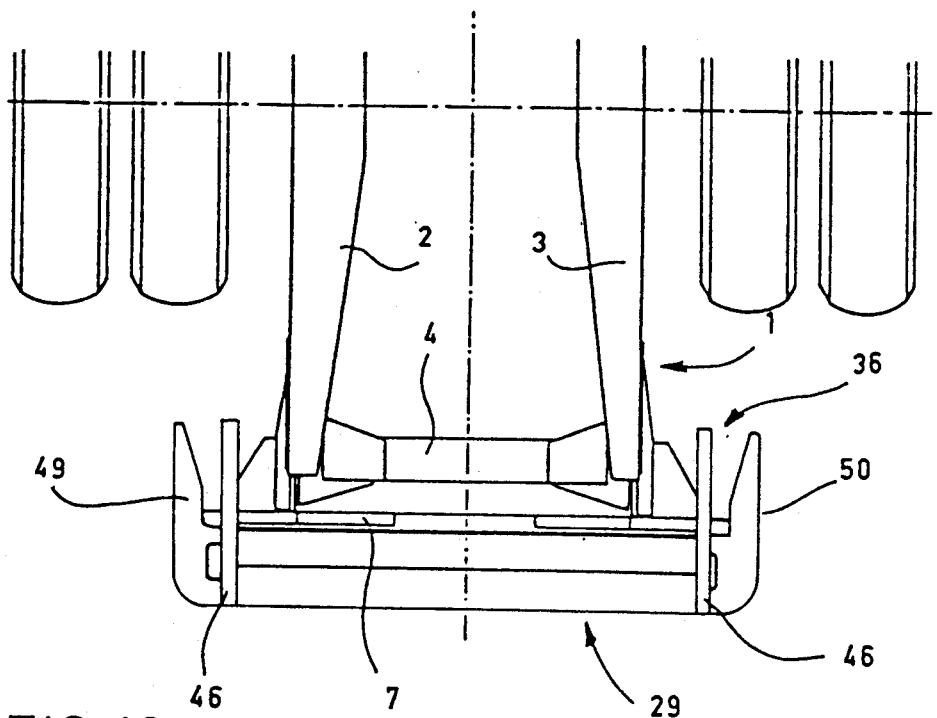
FIG. 12 is a plan view corresponding to FIG. 11 showing the self-centring mechanism coupled.
Figure 13:
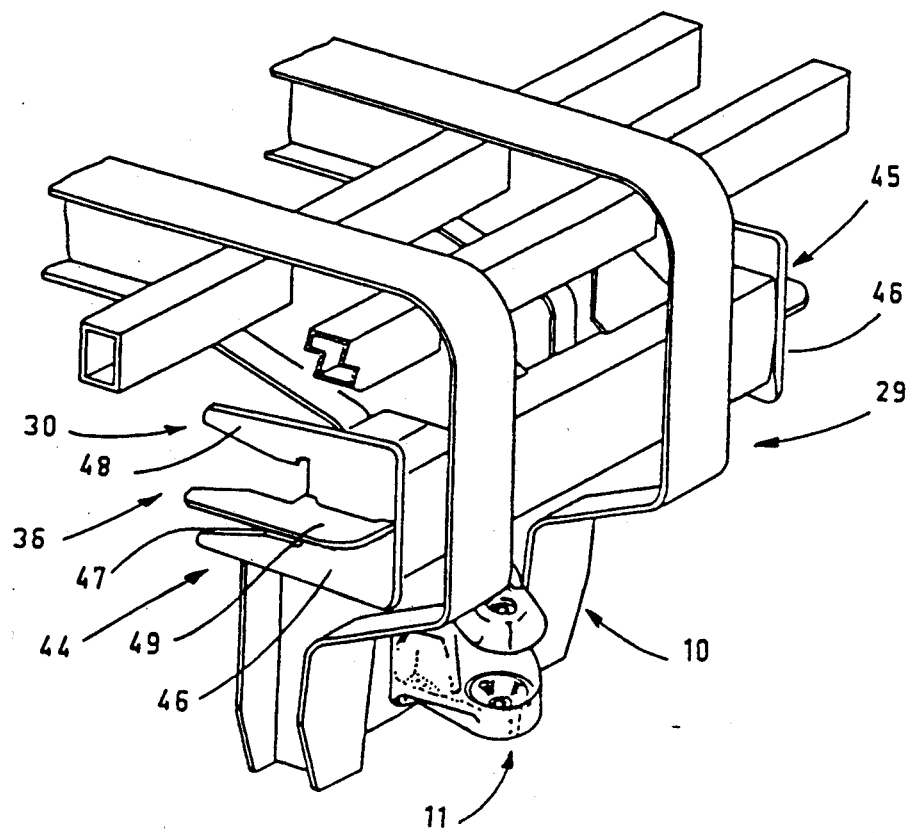
FIGS. 13 and 14 are perspective views showing the rear self-centring mechanism and the towing hook support viewed respectively from the rear and from the front according to the second alternative embodiment.
Figure 14:
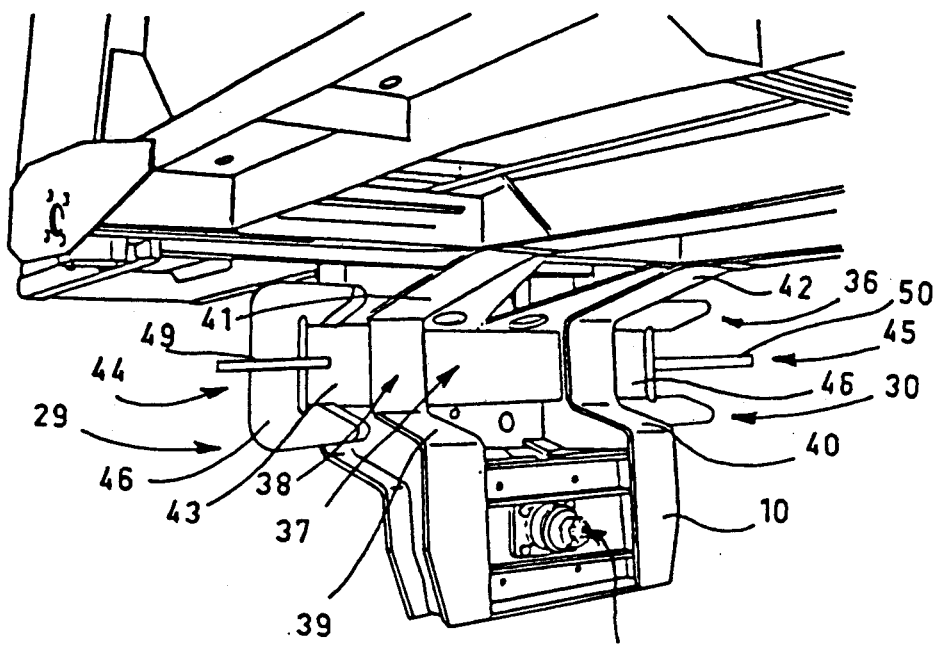

For reasons of clarity, the distance "D" is shown in FIG. 6.

Thus prepared, the tractor is ready to become a carrier.

Figure 18:
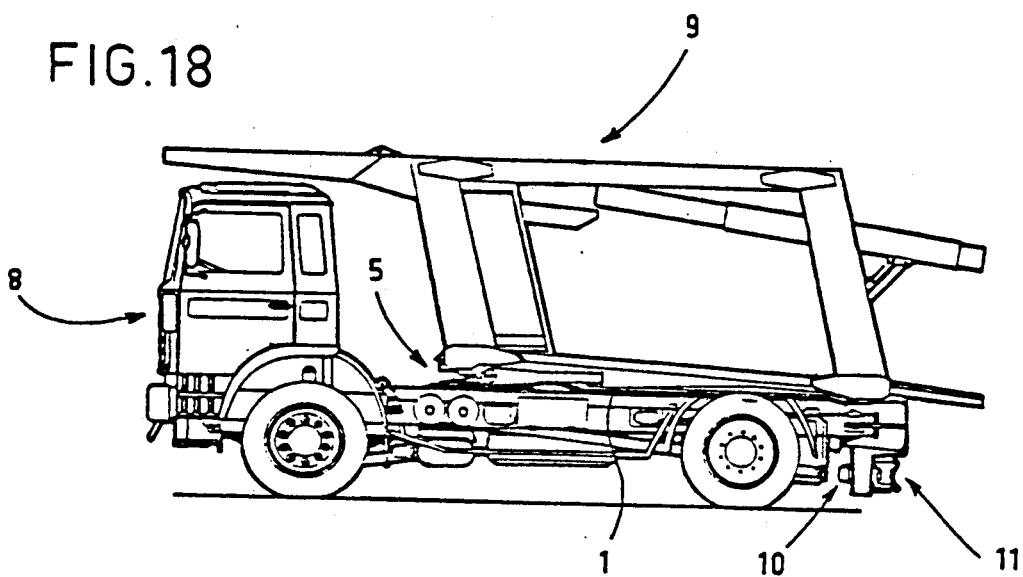
FIGS. 18 to 20 are profile views when the body is fixed to the carrier vehicle, for different types of carrier vehicles with different types of arrangement, respectively a single cabin, a double cabin, a long and an extra-long rig.
Figure 19:
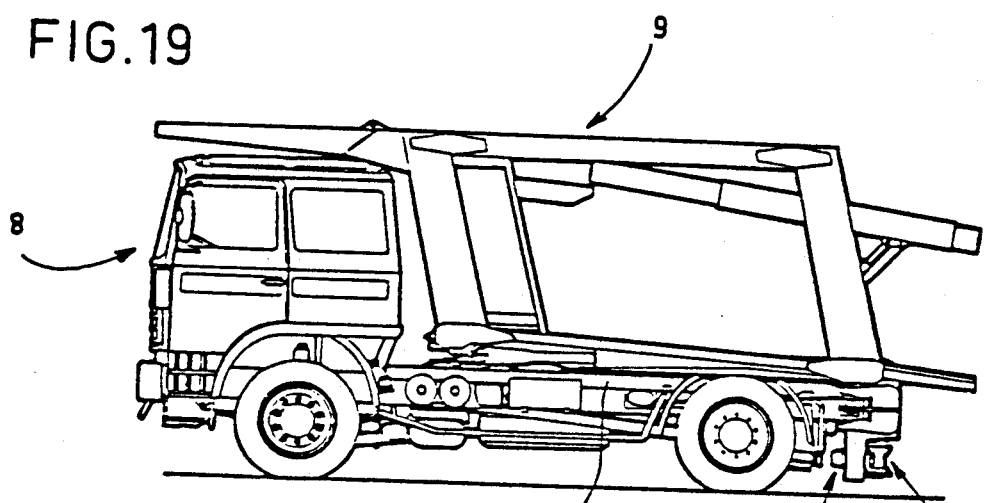
Figure 20:
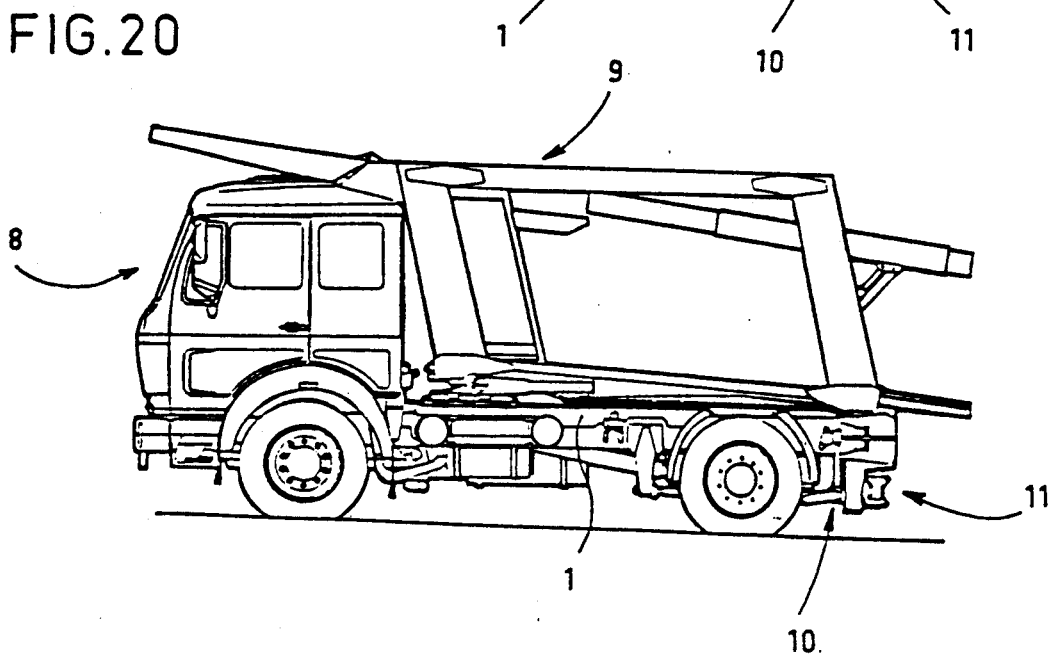

This characteristic feature is illustrated by FIGS. 18 to 20 which show various types of motor vehicles having different wheel bases, all of which are adaptable in order to receive the demountable body.

Once the chassis has been brought to the appropriate length, there is fixed on the end of the chassis a rear cross-plate 7 for horizontal coupling, intended to co-operate with a centring mechanism to provide a self-centring means as will be described hereinafter.

The chassis of the motor vehicle 8 which has thus been prepared is intended to receive a carrier structure, for example a body 9 particularly of the vehicle transporter type, and so to become a carrier.

According to one of the important characteristic features of the invention, this body comprises a support 10 for a towing hook 11 which is integrated into the lower rear part of the body.

This towing hook is intended to provide an articulated connection to a trailer 12 having for instance central axles, or having a front axle or any other arrangement, as shown in FIGS. 24 to 30. It is likewise intended to support the rear of the body when this is demounted, doing so through the draw-bar 13 which has one or more feet 14 for taking up the stress and disposed for example about half way along, these feet being intended together with the towing hook support to act as a rear support to ensure that the stable horizontal position is maintained.

The removable body consists of a frame 15 consisting of a base chassis 16 surmounted by a framework 17 having a self-supporting nature provided at the front by two telescopic jacks 18 and 19 which can be retracted into a rest position or which may be removed and, at the rear, by a support provided by the towing hook through its support on the draw-bar which itself is supported on the ground by the foot or feet 14.

Figure 15:
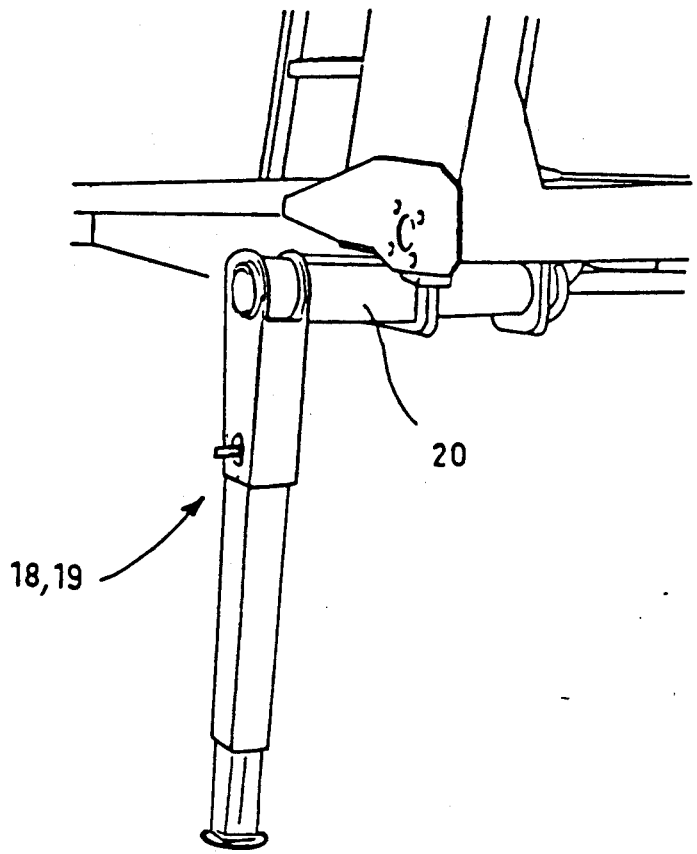
FIG. 15 is a perspective view showing a retractable vehicle transporter sustainer in the active supporting position.
Figure 16:
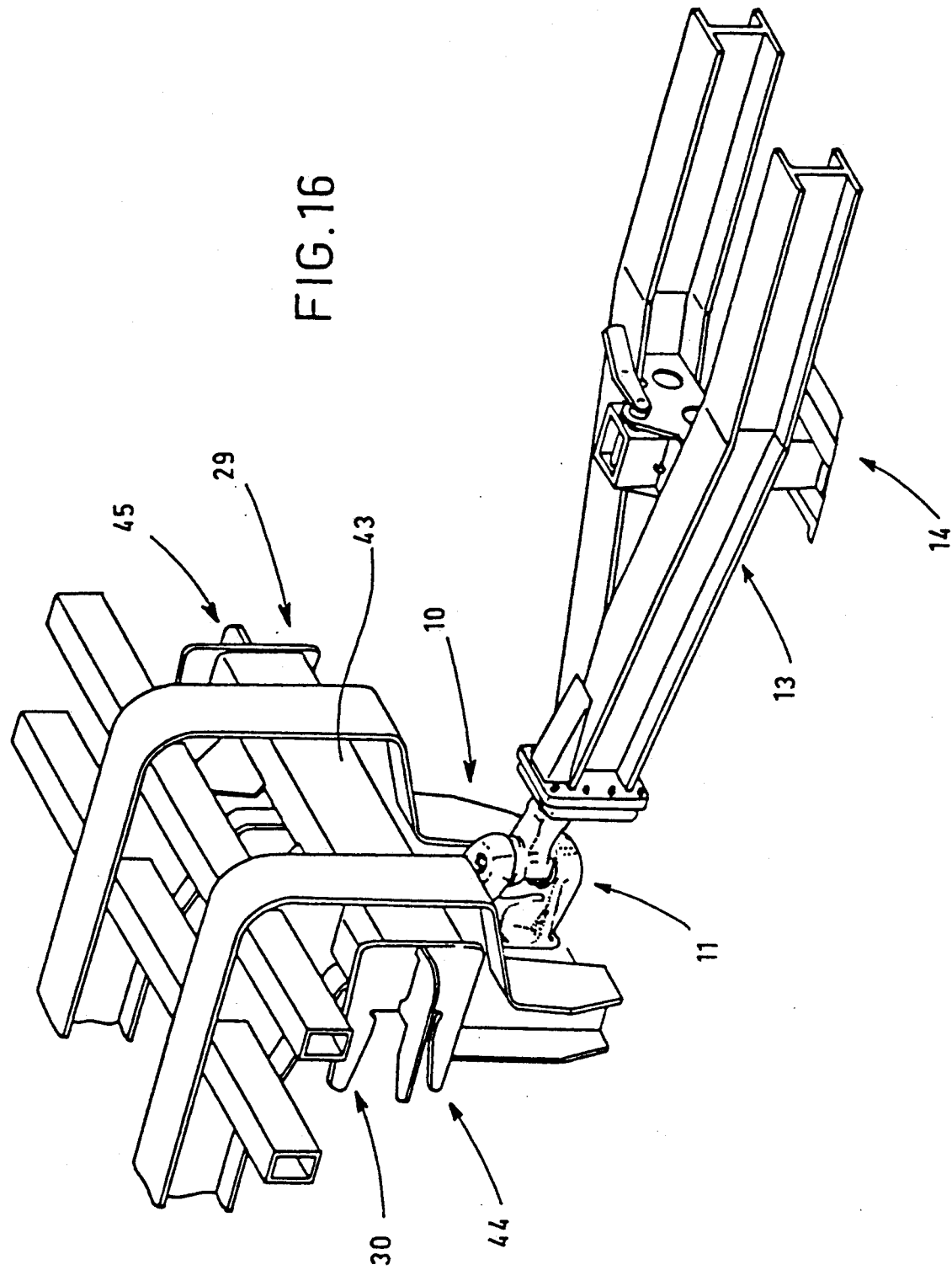
FIG. 16 is a perspective view showing the rear vehicle transporting support at the level of the draw gear in order to impart to the body its character as an integral vehicle transporter.

An example of retractable jack is shown in FIG. 15. These are for example mounted to pivot about a spindle 20.

Figure 17:
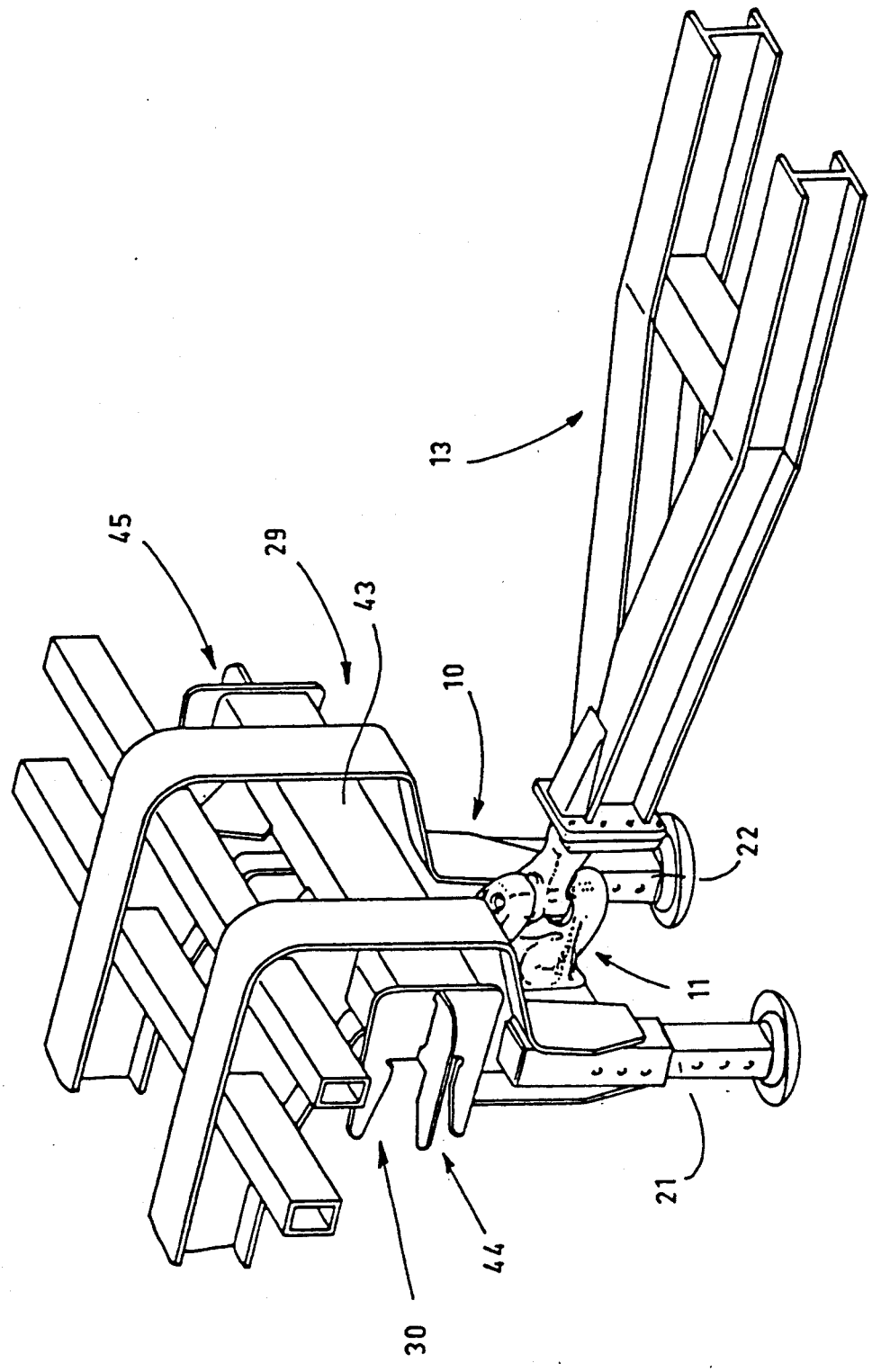
FIG. 17 is a perspective view of the towing hook support and of complementary jacks for supporting the rear part, which give the body its character of being an integral vehicle transporter.

An equivalent rear support is provided by two additional telescopic jacks such as 21 and 22 mounted for example to fold back into a rest position at the level of the towing hook support, on either side of this latter (FIG. 17).

The base chassis 16 of the demountable body forms a bottom support 23 which is laterally extended on either side by vertical or slightly inclined beams such as 24 and 25 which, for example above the chassis, support a lower loading plane 26 and, at a higher level, one or a plurality of movable upper loading planes such as 27 (individual) or a single plane.

Of course, other technical configurations are entirely possible and the rear axle bolster used as an example hereinabove may be replaced by any equivalent member.

As indicated, the demountable body is a structure which is entirely supported in a horizontal position which can therefore be abandoned by its carrier vehicle at any location, for example on a loading or unloading area with its trailer attached, so constituting an immobilised and waiting transport unit, predisposed for loading or unloading which can be carried out at any time, while the carrier vehicle can be used for other transporting tasks.

The demountable body has at the front, on its underside, a vertical spindle 28 conventionally referred to as a key-man, intended to co-operate with the rear axle bolster 5 which is suitably positioned to provide at the front a lateral locking supporting point, the pivot function being neutralised by the immobilisation at the rear.

This vertical axis is similar to the key-man which the semi-trailers have at the front, on the underside, through which all the mechanical traction stresses due to travelling are transmitted.

Immobilisation of the demountable body on the carrier vehicle is completed as follows.

The rear part of the base is extended downwards by a return 29 comprising the towing hook support 10 and an immobilising and centring means in the form of a self-centring means 30, for example of the flush fitting type, co-operating with the horizontal coupling cross-plate 7.

Hereinafter, two alternative forms of immobilising and centring means will be examined, being mechanisms in which there are self-centring structures 30 as referred to in FIGS. 7 to 14.

The first alternative relates to a simple mechanism comprising centring dogs (FIGS. 7 to 10).

According to this embodiment, the rear cross-plate 7 comprises on either side of its median transverse plane, left and right apertures respectively 31 and 32 in which corresponding conical centring dogs 33 and 34 engage, being carried by a support plate 35 which is rigid with the return 29.

According to an improvement, the openings 31 and 32 are possibly provided with sockets (not shown) in which the centring dogs engage.

The second alternative is a mechanism 36 having converging ramps. The rear cross-plate 7 takes a rectangular form or has rectangular ends (FIGS. 11 to 14).

The female reception mechanism, that is to say that which welcomes the body of the cross-plate 7, comprises a rectangular receiving zone 37 constituting the bottom of a space 38 converging by two lower converging ramps 39, 40 and upper converging ramps 41, 42 formed by the return of the rear supporting members of the demountable body.

This zone is laterally bounded by a bottom plate 43, of which each end is provided with a centring fork 44 and 45.

Each fork comprises a generally U-shaped vertical centring member 46, the ends of each arm of the U having opposite converging ramps 47 and 48 for centring at the bottom of the U.

Vertical immobilisation is completed by lateral immobilisation provided by two lateral dogs 49 and 50 fixed on the outer side of each U-shaped member, so providing a trident type of fork.

The configuration of these lateral dogs is for example identical to that of the ends of the U-shaped pieces, in the form of converging ramps, forcing the lateral edges of the cross-plate to become self-centring at the bottom of the receiving space.

The work of mounting the body on the carrier vehicle is carried out with a certain clearance to guarantee the slight movement which makes it possible to achieve locking by ratchet-type engagement at the front.

In order to generalise the present patent, there will be described hereinafter various types of rear parts of the demountable body chassis in conjunction with the lorry chassis, reference being made to FIGS. 31 to 36.

The rear of the base chassis 16 of the demountable body generally assumes the form of a weapon butt, and more particularly the form of the butt of a pistol, that is to say the form of a plate which continues vertically downwardly via the return 29.

This technical form described in greater detail hereinafter performs a number of functions:

in its lower part it forms a support for the towing hook;

it provides the necessary clearance in respect of the lorry chassis and provides a protection for the end thereof;

it makes it possible to achieve a low towing hook position required in the case of so-called balanced trailers;

it makes it possible to position the towing hook in a set back location in respect of the centring assembly;

the towing hook is placed as close as possible to the rear wheel in order to reduce the torque due to the load.

The bottom end of the return 29 carries the support 10 for the towing hook 11 which it is preferable but not necessary to move close to the rear axle in order to reduce the torque due to the transfer of the load of the trailer to the lorry, transmitted via the towing hook, as shown in FIGS. 33 and 34.

In order to bring the towing hook closer and thus in order to bring the bottom end of the return 29 of the rear of the base chassis 16 closer to the rear axle, the removable body will have an incurvate portion 51 with a preferably horizontal extension in a forwards direction, and then a downwards bend which is extended by a vertical terminal arm 52, offset towards the rear axle 53 in relation to the position of origin 54 of the downwardly extending return 29.

This configuration reveals a surrounding shape 55 making it possible to engage around and protect the rear end of the lorry chassis which is thus able to extend farther rearwardly from the rear axle 53.

This configuration furthermore ensures a set back and protected location for the selected centring and laterally immobilising device or mechanism 30 which is engaged either on the rear of the lorry chassis or on a suitable complementary structure placed close to it on the lorry chassis.

After having described the general forms with or without the set back of the rear of the base chassis 16 of the demountable body, there will be described hereinafter purely by way of illustration two examples of embodiment which employ these forms with various central and lateral immobilising means, reference being made to FIGS. 35 and 36.

The rear 56 of the base chassis 16 may for example take the form of an inclined plane 57 on the central part of which is fixed the return 29 (FIG. 35).

On its underside and at each of its ends, the inclined plane 57 comprises centring and supporting elements, for example mushroom-shaped elements 58 and 59 adapted to co-operate with generally "V"-shaped centring elements 60 and 61 provided at each of the ends of a centring plate 62 fixed in an inclined position at the rear end of the longitudinal members of the lorry chassis. The angle of inclination of the centring plate is identical to that of the inclined plane 57.

Another possible embodiment is shown in FIG. 36. This is based on the same general inventive principle.

The rear of the base chassis of the demountable body comprises, between the two longitudinal members, a centring member 63 of the slider-clip type, co-operating with a centring dog 64 mounted on the rear of the lorry chassis. This dog 64 has two vertical abutments for limiting the mechanical clearance.

On the other hand, the rear of the base chassis 16 comprises a supporting cross-plate 65 which rests on two zones 66 and 67 provided at the ends of the longitudinal members of the lorry chassis.

To facilitate assembly, the rear ends of the longitudinal members of the lorry chassis each comprise a downwardly inclined ramp.

Here it will be recalled that in the various alternative embodiments, the longitudinal locking is provided by a specific member disposed at the front end of the chassis of the demountable body and of the lorry chassis.

This member simultaneously ensures the main support needed for the load in order to relieve the strain on the rear.

The overall operation is illustrated by FIGS. 21 to 26.

The demountable body is deposited empty or loaded so that the tractor vehicle is available for other transporting tasks.

The body is supported at the front by fold-back jacks and at the rear by the fact that the stress is absorbed through the towing hook bearing on the draw-bar which rests on the ground through feet 14. The body is thus maintained in a stable and balanced position by being supported at least at three points.

As indicated, it is of course possible to dispense with the support provided by the draw-bar of the trailer, in which case the rear of the body must be equipped with additional jacks 21 and 22 at the level of the towing hook support or the like.

It is likewise possible to support the rear of the body by any other conventional supporting means.

There will now follow a description of a characteristic programme for the commercial exploitation of the unit by a road haulage company, the various phases of operation of the road transport unit according to the invention being explained with reference to FIGS. 21 to 26.

The motor vehicle is first of all allocated to the transport of goods by means of a semi-trailer 48 after having been converted to a tractor vehicle (FIG. 21).

Having arrived at its destination, it is uncoupled from its semi-trailer 51 (FIG. 22) and is prepared to serve as a carrier-tractor vehicle by the simple operation of shifting its rear axle bolster to the position provided on its chassis (FIG. 23).

Thus adapted, it moves close to the carrier body to which it will be coupled by fitting into the underside thereof. The carrier body, waiting, is already loaded and attached to a trailer on a loading area with a view to being transported to the delivery site (FIG. 24).

The motor vehicle lines itself up and selects reverse gear, facing the demounted body which is supported by its jacks and by its rear support. It fits under the body so that it can be coupled thereto (FIG. 25).

Having arrived in contact, coupling is carried out quickly as follows. The self-centring mechanism receives the cross-plate 7 which is positioned in its receiving structure. At the same time, the key-man engages in the lock of the rear axle bolster by virtue of the clearance which is provided. All that remains is to lock it.

The rear centring support and the pivot support point at the front provide for complete fixing of the body on the chassis of the vehicle which has become a carrier-tractor which, once the jacks and the rear support have been retracted, carries away the moving assembly which is thus converted into a road transport unit.

When it arrives at its destination, the carrier vehicle abandons the road transport assembly to which it had been coupled by separating therefrom, the above operations being reversed, so that the tractor vehicle is separated from the demountable body and, after the retractable jacks have been deployed and after the rear support has been extended, the tractor vehicle moves away from the body which is now supported in a stable position and in the demounted state.

After separation from the rear axle bolster, a simple travelling manoeuvre in forward gear is sufficient for the tractor vehicle to be completely clear.

The body, supported by its jacks and its rear support, can be left on an unloading area. After the envisaged adaptation, the carrier vehicle can become a tractor for another transport application while the demounted body is being unloaded.

Thus, full employment of the tractor vehicle is guaranteed with the minimum of down time.

As loading is completed, the assembly is that illustrated in FIGS. 24, 27 and 29. It is ready to be towed by another suitably adapted tractor vehicle.

The invention has been described in detail hereinabove. However, it is quite clear that various simple modifications, additions, direct alternatives, substitutions by equivalent means may be included in the framework of the present protection.

Of course, the scope of the invention is not limited to one or other particular means or element. In particular, it is not limited to a member of the rear axle bolster type but extends to all equivalent means.

I claim:

1. A road transport unit, comprising:
   a tractor vehicle;
   first means mounted upon said tractor vehicle for permitting a trailer vehicle to be pivotably connected to said tractor vehicle;
   second coupling means mounted upon a rear portion of said tractor vehicle; and
   a carrier body having third coupling means mounted upon a first end thereof for connection with said first pivotable connection means of said tractor vehicle, fourth coupling means mounted upon a second end of said carrier body for connection with said second coupling means of said tractor vehicle so as to prevent relative pivotable movement between said tractor vehicle and said carrier body and to fixedly support said carrier body upon said tractor vehicle, and fifth coupling means mounted upon said second end of said carrier body for permitting connection to said trailer vehicle,
   whereby when said carrier body is coupled to said tractor vehicle, said road transport unit may comprise a three vehicle unit comprising said tractor vehicle, said carrier body, and said trailer vehicle, whereas when said carrier body is disconnected from said tractor vehicle, said road transport unit may comprise a two vehicle unit comprising said tractor vehicle and said trailer vehicle as a result of coupling said trailer vehicle to said tractor vehicle by means of said first coupling means of said tractor vehicle.

2. A road transport unit as set forth in claim 1, wherein:
   said first coupling means mounted upon said tractor vehicle comprises a fifth-wheel.

3. A road transport unit as set forth in claim 1, further comprising:
   means for stably supporting said carrier body upon a horizontal surface when said carrier body is disconnected from said tractor vehicle.

4. A road transport unit as set forth in claim 3, wherein said stable supporting means comprises:
   a pair of laterally spaced downwardly extending telescopic jack members pivotably mounted upon said first end of said carrier body.

5. A road transport unit as set forth in claim 3, wherein said stable supporting means comprises:
   a downwardly extending support structure upon which said fifth coupling means of said carrier body is fixedly mounted.

6. A road transport unit as set forth in claim 5, wherein:
   said fifth coupling means comprises a towing hook.

7. A road transport unit as set forth in claim 6, wherein said stable supporting means comprises:
   a pair of laterally spaced downwardly extending telescopic jack members pivotably mounted upon said support structure upon opposite sides of said towing hook.

8. A road transport unit as set forth in claim 1, wherein said carrier body comprises:
   a chassis; and
   a superstructure framework fixedly mounted upon said chassis so as to form with said chassis a vehicle enclosure within which and upon which additional road vehicles can be transportably supported.

9. A road transport unit as set forth in claim 8, wherein:
   said second coupling means of said tractor vehicle comprises a centering plate having a predetermined downward inclination and a pair of laterally spaced, substantially V-shaped notches defined therein; and said fourth coupling means of said carrier body comprises an inclined planar portion of said chassis having a predetermined downward inclination substantially the same as that of said centering plate of said tractor vehicle, and a pair of laterally spaced mushroom-shaped boss-type elements for operatively engaging said V-shaped notches of said centering plate of said tractor vehicle.

10. Road transport unit according to claim 8, characterised in that the carrier body includes a return (29) at the rear of the chassis (16) which has an incurvate portion (51) with a horizontal extension in a forwards direction, and then a bend which extends downwardly, and extended by a vertical end portion (52) which is offset towards the rear axle (53) in relation to the original position (54) of the downwardly extending return (29), providing an enveloping shape (55) which makes it possible to engage around and protect the rear end of said tractor vehicle.

11. A road transport unit as set forth in claim 1, wherein:

said second coupling means of said tractor vehicle comprises a cross-plate fixedly mounted upon said rear portion of said tractor vehicle and having a pair of laterally spaced apertures defined therein; and said fourth coupling means of said carrier body comprises a pair of laterally spaced dogs fixedly mounted upon said carrier body for engagement with said apertures of said tractor vehicle cross-plate.

12. A road transport unit as set forth in claim 1, wherein:

said second coupling means of said tractor vehicle comprises a substantially rectangularly shaped cross-plate fixedly mounted upon said rear portion of said tractor vehicle; and said fourth coupling means of said carrier body comprises a pair of laterally spaced, substantially U-shaped members for enclosing opposite ends of said tractor vehicle cross-plate, and a pair of laterally spaced dog plates fixedly mounted upon external surfaces of said U-shaped members for enclosing said opposite ends of said cross-plate in a laterally confining manner.

13. A road transport unit as set forth in claim 1, wherein:

said second coupling means of said tractor vehicle comprises a substantially rectangularly shaped cross-plate fixedly mounted upon said rear portion of said tractor vehicle; and and said fourth coupling means of said carrier body comprises self-centering converging ramp means for cooperating with and confining said cross-plate of said tractor vehicle in longitudinal, vertical, and lateral directions.

14. Road transport unit according to claim 13, characterised in that the ramp means which receives the cross-plate (7) comprises a rectangular zone (35) constituting a space (36) converging by two bottom converging ramps (39), (40) and top converging ramps (41), (42) of the second end of said carrier body, the said rectangular zone being defined by an end plate (43), each end of which is provided with a centering fork.

15. Road transport unit according to claim 14, characterised in that each fork comprises generally U-shaped vertical centering member (46), in which the ends of each arm have opposite converging ramps (47) and (48) and in that vertical immobilisation is completed by lateral immobilisation provided by two lateral dogs (49) and (50) which are mounted on the outside of each U-shaped member to form a trident type of fork.

16. A road transport unit as set forth in claim 1, wherein:

said second coupling means of said tractor vehicle comprises an upstanding dog element; and said fourth coupling means of said carrier body comprises substantially U-shaped slot means for slidably engaging said upstanding dog element of said tractor vehicle.

* * * * *